G. M. HOLMAN.
NUT LOCK.
APPLICATION FILED MAR. 21, 1908.
913,501.
Patented Feb. 23, 1909.
Fig. 1.
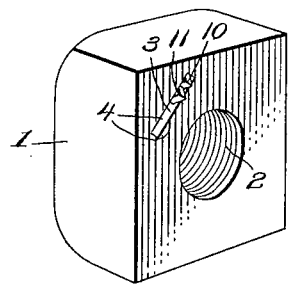
Fig. 2.
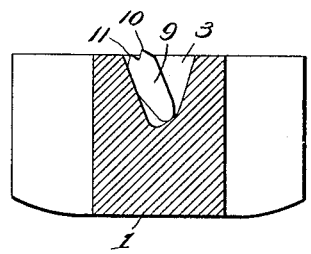
Fig. 3.   Fig. 4.   Fig. 5.
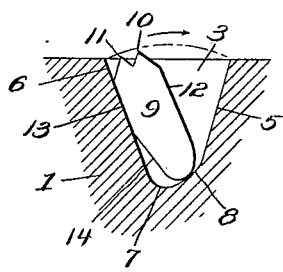 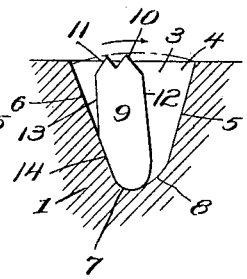 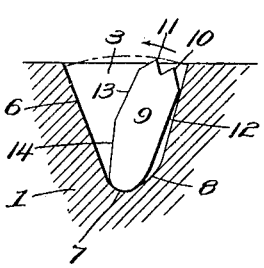
Inventor
Gustave M. Holman.
Witnesses
F. C. Gibson.
A. C. Hines.
By Victor J. Evans
Attorney

UNITED STATES PATENT OFFICE.

GUSTAVE M. HOLMAN, OF DAPHNE, ALABAMA, ASSIGNOR OF ONE-HALF TO ANNIE ELIZABETH MASON, OF MONROEVILLE, ALABAMA.

NUT-LOCK.

No. 913,501.     Specification of Letters Patent.     Patented Feb. 23, 1909.

Application filed March 21, 1908. Serial No. 422,565.

*To all whom it may concern:*

Be it known that I, GUSTAVE M. HOLMAN, a citizen of the United States, residing at Daphne, in the county of Baldwin and State of Alabama, have invented new and useful Improvements in Nut-Locks, of which the following is a specification.

This invention relates to improvements in nut locks, the object of the invention being to provide a nut having a recess and a locking dog operating therein and provided with a toothed end to engage the surface of the part clamped by the nut, said recess and dog being so constructed as to secure an automatic adjustment of the dog to different positions to permit the nut to be screwed on, to lock the nut in applied position and to permit ready removal of the nut when occasion requires.

The invention consists of the features of construction, combination and arrangement of parts hereinafter fully described and claimed, reference being had to the accompanying drawing, in which:—

Figure 1 is a perspective view of a nut embodying my invention. Fig. 2 is a section through the same taken on a line longitudinally through the recess. Figs. 3, 4 and 5 are views similar to Fig. 2 on an enlarged scale, showing the different positions the dog is adapted to assume.

Referring to the drawing, the numeral 1 designates a nut of any conventional form and having the usual threaded bore 2 for the passage of the bolt on which the nut is to be screwed. The base or bearing face of the nut is provided with a socket or recess 3 extending a suitable distance into the body of the nut and arranged, as shown in Fig. 1, diagonally across said face of the nut adjacent to one of the corners thereof, so that the toothed end of the locking dog will have an orbit of movement concentric with the bore 2 in the operation of screwing the nut on or off the bolt. The recess 3 is of oblong rectangular form at its outer end or point where it opens through the bearing face of the nut and thence tapers inwardly, so that the socket as a whole is of approximately V-form. The side walls 4 of the socket are straight and parallel, while the front and rear end walls 5 and 6 of said socket, considered in the direction of rotation of the nut in applying it to the bolt, are inclined or extend inwardly on converging lines. The wall 6 inclines uniformly inward on a straight line to the extreme inner end of the socket, where it merges into an arcuately curved seat 7, while the wall 5, which is relatively shorter than the wall 6, terminates at its inner end above the bottom or inner wall of the socket, which latter, in addition to being curved to form the seat 7, is formed to provide an inclined shoulder 8 disposed between the inner end of the wall 5 and the seat 7, said shoulder being disposed approximately at an oblique angle to both of the walls 5 and 6.

The locking dog 9 comprises a comparatively long and narrow flat plate of a length slightly exceeding the length of the socket or recess and having its side faces plane or smooth surfaced to slide easily in contact with the side walls 4 of the recess. The inner end of the dog is curved to fit the seat 7, while its outer end is provided with locking teeth 10 and 11 arranged on opposite sides of its axis or longitudinal center. The front side edge 12 of the dog is comparatively straight throughout its length, while the opposite side edge of the dog is provided with a straight surface 13 parallel with the edge 12 and extending inwardly from the tooth 11 to a point just beyond the transverse center of the dog, from which point the said side edge of the dog is beveled inwardly, as at 14, to the inner curved end thereof.

It will be seen from the foregoing description that the dog is loosely mounted in the socket or recess 3, and it is in operation adjustable to the three different positions shown respectively in Figs. 3, 4 and 5 automatically by contact with the surface of the part engaged or clamped by the bearing face of the nut. Assuming that the nut is provided with a right hand thread and is turned in the direction of the arrow shown in Fig. 3 for adjustment on a bolt to clamp it in position, it will be understood that if the dog is in either of the other positions shown it will be moved to the position shown in Fig. 3 by contact with the part to be engaged or clamped as soon as the teeth 10 and 11 move into engagement therewith. The dog will thus be tilted to the left so that its surface 13 will rest against the wall 6 and its curved inner end against the shoulder 8, by which, owing to the inclined position of the dog thus assumed, the tooth 11 will lie practically within the plane of the face of the nut, while the tooth 10 will project slightly beyond the same and present its inclined outer surface for contact with the surface of the part to be clamped. This allows the nut to be screwed up until the nut is brought into clamping engagement, whereby the teeth of the dog are caused to bite into the surface of the clamped part to hold the nut from retrograde rotation.

The engagement of the teeth of the dog when the latter is in the position shown in Fig. 3 will be sufficient under all ordinary circumstances to lock the nut from movement, but in the event that the nut should be unduly jarred or shaken and caused to turn backward to a slight extent, the engagement of the teeth with the part clamped will cause the dogs to be brought to the position shown in Fig. 4, in which the dog extends at a slight rearward angle to the longitudinal center of the recess with its curved inner end engaging the seat 7 and its beveled face 14 resting against the wall 6. Both teeth 10 and 11 will thus be projected to the fullest extent in the arc of movement of the dog and will thus bind with greater force against the surface of the clamped part and prevent further retrograde movement of the nut, thereby firmly locking it in applied position against movement under all the pressures and strains to which it is ordinarily subjected.

The nut may be turned back for removal by the use of a wrench or like tool and the expenditure of a greater amount of force than that which it is subjected to in service. The forcible backward rotation of the nut will obviously cause the dog to be shifted to the position shown in Fig. 5, in which the upper portion of the edge 12 of the dog will bear against the wall 5, while the lower end of the dog will rest within the seat 7. As a result, the forward toothed pin of the dog will lie wholly within the recess, while the rear tooth 11 will project but slightly beyond the same and present its outer beveled face for contact with the surface of the clamped element, so that by a forcible rearward rotation the nut may be removed without injury to the parts beyond the slight grooving or scoring of the clamped element by a contact of the point of the tooth 11 therewith.

It will accordingly be seen that my invention provides a nut lock of the type described in which the construction of the dog and recess is such as to permit ready application of the nut, to lock the nut securely in applied position and to permit of the convenient removal of the nut when occasion requires, the advantages of which over the ordinary construction of lock of this type in which removal of the applied nut is prevented by the dog will be manifest.

Having thus fully described the invention, what is claimed as new is:—

A nut provided with a recess opening through the bearing face thereof and arranged diagonally across said face, said recess being of oblong rectangular form at its outer end and provided with parallel side walls and having its end walls converging inwardly to form a substantially V-shaped chamber, the inner wall of said chamber being formed to provide a curved seat at the base of the rear end wall and a beveled or inclined shoulder between said seat and the inner end of the front end wall, and a dog loosely mounted in said chamber and provided with an inner curved end for contact with said seat and shoulder and having at its outer end a pair of V-shaped locking teeth arranged on opposite sides of the longitudinal center thereof, the rear edges of the dog being formed with a straight outer portion and a beveled inner portion for engagement with the rear end wall of the recess, substantially as described.

In testimony whereof I affix my signature in presence of two witnesses.

GUSTAVE M. HOLMAN.

Witnesses:
S. S. WHITE,
S. E. SIMMONS.